(12) United States Patent
Ishikawa et al.

(10) Patent No.: US 12,331,937 B2
(45) Date of Patent: Jun. 17, 2025

(54) HEATER DEVICE

(71) Applicant: DENSO CORPORATION, Kariya (JP)

(72) Inventors: Kimitake Ishikawa, Kariya (JP); Yusuke Tanaka, Kariya (JP); Hideki Seki, Kariya (JP); Shuji Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 1181 days.

(21) Appl. No.: 17/157,244

(22) Filed: Jan. 25, 2021

(65) Prior Publication Data

US 2021/0140644 A1 May 13, 2021

Related U.S. Application Data

(63) Continuation of application No. PCT/JP2019/029291, filed on Jul. 25, 2019.

(30) Foreign Application Priority Data

Aug. 7, 2018 (JP) ................................. 2018-148684

(51) Int. Cl.
*B60H 1/22* (2006.01)
*B60N 2/00* (2006.01)
(Continued)

(52) U.S. Cl.
CPC .............. *F24C 7/043* (2013.01); *G01V 3/088* (2013.01); *H05B 3/03* (2013.01)

(58) Field of Classification Search
CPC ................ B60H 1/22; F24C 7/04; H05B 3/20
See application file for complete search history.

(56) References Cited

U.S. PATENT DOCUMENTS 5,871,232 A * 2/1999 White ............... B60R 21/01534
280/735
9,006,618 B2 * 4/2015 Lamesch ........... B60R 21/01532
219/202
(Continued)

FOREIGN PATENT DOCUMENTS

| JP | 3792064 B2 | 6/2006 |
| JP | 2014190674 A | 10/2014 |
| JP | 5954235 B2 | 7/2016 |

*Primary Examiner* — Dana Ross
*Assistant Examiner* — Lawrence H Samuels
(74) *Attorney, Agent, or Firm* — Harness, Dickey & Pierce, P.L.C.

(57) ABSTRACT

A heater device includes a first detection pattern that is arranged on an insulating substrate and detects a change in capacitance between a first transmitting electrode and a first receiving electrode for detecting an object, a second detection pattern that is arranged on the insulating substrate and detects the change in capacitance between a second transmitting electrode and a second receiving electrode for detecting the object, a capacitance determination unit that determines whether one of the change in capacitance between the first transmitting electrode and the first receiving electrode and the change in capacitance between the second transmitting electrode and the second receiving electrode is equal to or higher than a first threshold value and the other is lower than a second threshold value, and a disconnection determination unit that determines a disconnection in the first or the second detection pattern, when result of the capacitance determination unit is positive.

7 Claims, 5 Drawing Sheets

(51) Int. Cl.
*F24C 7/04* (2021.01)
*G01V 3/08* (2006.01)
*H05B 3/03* (2006.01)

(56) References Cited

U.S. PATENT DOCUMENTS

| | | | | |
|---|---|---|---|---|
| 9,244,576 | B1* | 1/2016 | Vadagave | H04N 21/42224 |
| 2010/0140992 | A1* | 6/2010 | Yamaguchi | B60N 2/0244 |
| | | | | 297/217.3 |
| 2010/0315090 | A1* | 12/2010 | Ootaka | B60N 2/002 |
| | | | | 324/452 |
| 2010/0327638 | A1* | 12/2010 | Petereit | B60R 21/01532 |
| | | | | 297/180.12 |
| 2011/0121618 | A1* | 5/2011 | Fischer | B60N 2/002 |
| | | | | 297/180.12 |
| 2011/0313622 | A1* | 12/2011 | Togura | B60R 21/01552 |
| | | | | 701/45 |
| 2012/0061365 | A1* | 3/2012 | Okamoto | B60H 1/2225 |
| | | | | 219/202 |
| 2013/0127211 | A1* | 5/2013 | Aoki | B60N 2/002 |
| | | | | 297/180.12 |
| 2013/0134745 | A1* | 5/2013 | Aoki | B60N 2/002 |
| | | | | 297/180.12 |
| 2013/0234735 | A1* | 9/2013 | Nakagawa | G01R 27/2605 |
| | | | | 324/658 |
| 2013/0291439 | A1* | 11/2013 | Wuerstlein | G07C 9/00309 |
| | | | | 49/357 |
| 2014/0125355 | A1* | 5/2014 | Grant | B61D 33/0057 |
| | | | | 324/629 |
| 2015/0345998 | A1* | 12/2015 | Lamesch | B60N 2/002 |
| | | | | 324/686 |
| 2016/0039265 | A1* | 2/2016 | Ota | B60H 1/2218 |
| | | | | 219/202 |
| 2016/0274726 | A1* | 9/2016 | Chung | G06F 3/014 |
| 2017/0147144 | A1* | 5/2017 | Lee | G06F 3/04166 |
| 2017/0253121 | A1* | 9/2017 | Kwon | G06F 3/044 |
| 2017/0307415 | A1* | 10/2017 | Honda | B60N 2/7094 |
| 2018/0022233 | A1* | 1/2018 | Maguire | B60R 21/015 |
| | | | | 701/46 |
| 2018/0178676 | A1* | 6/2018 | Cech | G01V 3/12 |
| 2018/0335460 | A1* | 11/2018 | Streett | G01V 3/088 |
| 2020/0236740 | A1* | 7/2020 | Tanaka | B60H 1/2227 |

* cited by examiner

|   | Ch1-1 | Ch1-2 | Ch2-1 | Ch2-2 |
|---|---|---|---|---|
| A | ○ | × | ○ | × |
| B | ○ | ○ | ○ | × |
| C | × | ○ | ○ | × |
| D | × | ○ | × | ○ |

HEATER DEVICE

CROSS REFERENCE TO RELATED APPLICATIONS

This application is a continuation application of International Patent Application No. PCT/JP2019/029291 filed on Jul. 25, 2019, which designated the U.S. and based on and claims the benefits of priority of Japanese Patent Application No. 2018-148684 filed on Aug. 7, 2018. The entire disclosure of all of the above applications is incorporated herein by reference.

TECHNICAL FIELD

The present disclosure relates to a heater device.

BACKGROUND

The heater device detects a change in capacitance caused by an object approaching a heat generating portion. When it is detected that the object is positioned within a predetermined range from a main body portion, the energization of an energizing portion is controlled so that an energizing amount to the energizing portion is smaller than the energizing amount in a normal state.

SUMMARY

The present disclosure provides a heater device capable of detecting and determining a disconnection of a detection pattern.

According to one aspect of the present disclosure, a heater device having a heat generating portion arranged on an insulating substrate includes:
- a first detection pattern arranged on the insulating substrate, having a first transmitting electrode and a first receiving electrode for detecting an object, the first detection pattern being configured to detect a change in capacitance between the first transmitting electrode and the first receiving electrode;
- a second detection pattern arranged on the insulating substrate, having the second transmitting electrode and the second receiving electrode for detecting the object, and the second detection pattern being configured to detect the change in capacitance between the second transmitting electrode and the second receiving electrode;
- a the capacitance determination unit determines whether or not one of the change in capacitance between the first transmitting electrode and the first receiving electrode and the change in capacitance between the second transmitting electrode and the second receiving electrode is equal to or higher than the first threshold value, whether or not the other of the change in capacitance between the first transmitting electrode and the first receiving electrode and the change in capacitance between the second transmitting electrode and the second receiving electrode is lower than the second threshold value; and
- a disconnection determination unit configured to determine that the disconnection of the first detection pattern or the second detection pattern occurs, when the capacitance determination unit determines that one of the change in capacitance between the first transmitting electrode and the first receiving electrode and the change in capacitance between the second transmitting electrode and the second receiving electrode is equal to or higher than the first threshold value, and the other of the change in capacitance between the first transmitting electrode and the first receiving electrode and the change in capacitance between the second transmitting electrode and the second receiving electrode is lower than the second threshold value.

DETAILED DESCRIPTION

Figure 1:
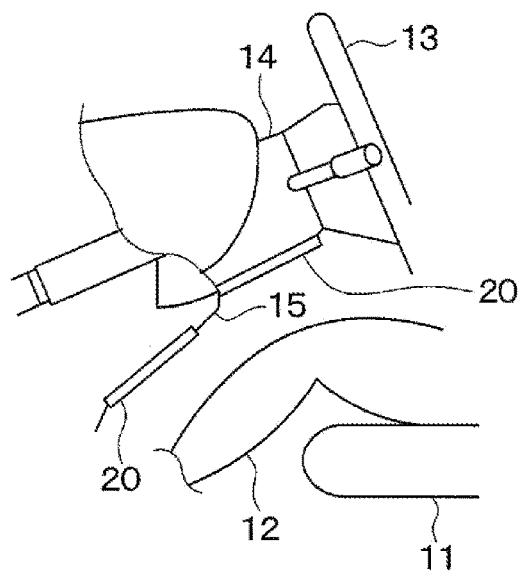
FIG. 1 is a diagram showing a mounting position of a heater device according to a first embodiment.

In an assumable example, the heater device detects a change in capacitance caused by an object approaching a heat generating portion. When it is detected that the object is positioned within a predetermined range from a main body portion, the energization of an energizing portion is controlled so that an energizing amount to the energizing portion is smaller than the energizing amount in a normal state.

According to the study of the inventor, the above-mentioned device has a detection pattern configured to detect a change in capacitance, but cannot detect and determine a disconnection of the detection pattern. An object of the present disclosure is to enable detection and determination of disconnection of the detection pattern.

According to one aspect of the present disclosure, a heater device having a heat generating portion arranged on an insulating substrate includes:
- a first detection pattern arranged on the insulating substrate, having a first transmitting electrode and a first receiving electrode for detecting an object, the first detection pattern being configured to detect a change in capacitance between the first transmitting electrode and the first receiving electrode;
- a second detection pattern arranged on the insulating substrate, having the second transmitting electrode and the second receiving electrode for detecting the object, and the second detection pattern being configured to detect the change in capacitance between the second transmitting electrode and the second receiving electrode;
- a the capacitance determination unit determines whether or not one of the change in capacitance between the first transmitting electrode and the first receiving electrode and the change in capacitance between the second transmitting electrode and the second receiving electrode is equal to or higher than the first threshold value, whether or not the other of the change in capacitance between the first transmitting electrode and the first receiving electrode and the change in capacitance between the second transmitting electrode and the second receiving electrode is lower than the second threshold value; and a disconnection determination unit configured to determine that the disconnection of the first detection pattern or the second detection pattern occurs, when the capacitance determination unit determines that one of the change in capacitance between the first transmitting electrode and the first receiving electrode and the change in capacitance between the second transmitting electrode and the second receiving electrode is equal to or higher than the first threshold value, and the other of the change in capacitance between the first transmitting electrode and the first receiving electrode and the change in capacitance between the second transmitting electrode and the second receiving electrode is lower than the second threshold value.

Further, the disconnection determination unit determines that the disconnection of the first detection pattern or the second detection pattern occurs, when the capacitance determination unit determines that one of the change in capacitance between the first transmitting electrode and the first receiving electrode and the change in capacitance between the second transmitting electrode and the second receiving electrode is equal to or higher than the first threshold value, and the other of the change in capacitance between the first transmitting electrode and the first receiving electrode and the change in capacitance between the second transmitting electrode and the second receiving electrode is lower than the second threshold value. That is, it is possible to detect and determine the disconnection of the detection pattern.

First Embodiment

A heater device of a first embodiment will be described with reference to FIGS. 1 to 8. As shown in FIG. 1, the heater device 20 is installed in an interior of a moving body such as a road traveling vehicle. The heater device 20 is a part of the heating device for the interior. The heater device 20 is an electric heater that is supplied with a power from a power supply such as a battery and a generator mounted on the moving body to generate heat. The heater device 20 has a thin plate-shape. The heater device 20 generates heat when power is supplied. The heater device 20 radiates a radiant heat H primarily in a direction perpendicular to a surface of the heater device 20 to warm a target object positioned in the direction perpendicular to the surface.

A seat 11 on which an occupant 12 is seated is installed in the interior. The heater device 20 is installed in the interior to radiate the radiant heat H to feet of the occupant 12. The heater device 20 can be used for quickly providing warmth to the occupant 12 immediately after activating other heater devices, for example. The heater device 20 is installed on a wall surface of the interior. The heater device 20 is arranged to face the occupant 12 who is in an assumed normal posture. The road traveling vehicle has a steering column 13 for supporting a steering wheel 14. The heater device 20 is installed on a lower surface of the steering column 14 and a lower surface of a column cover 15 so as to face the occupant 12.

Figure 2:
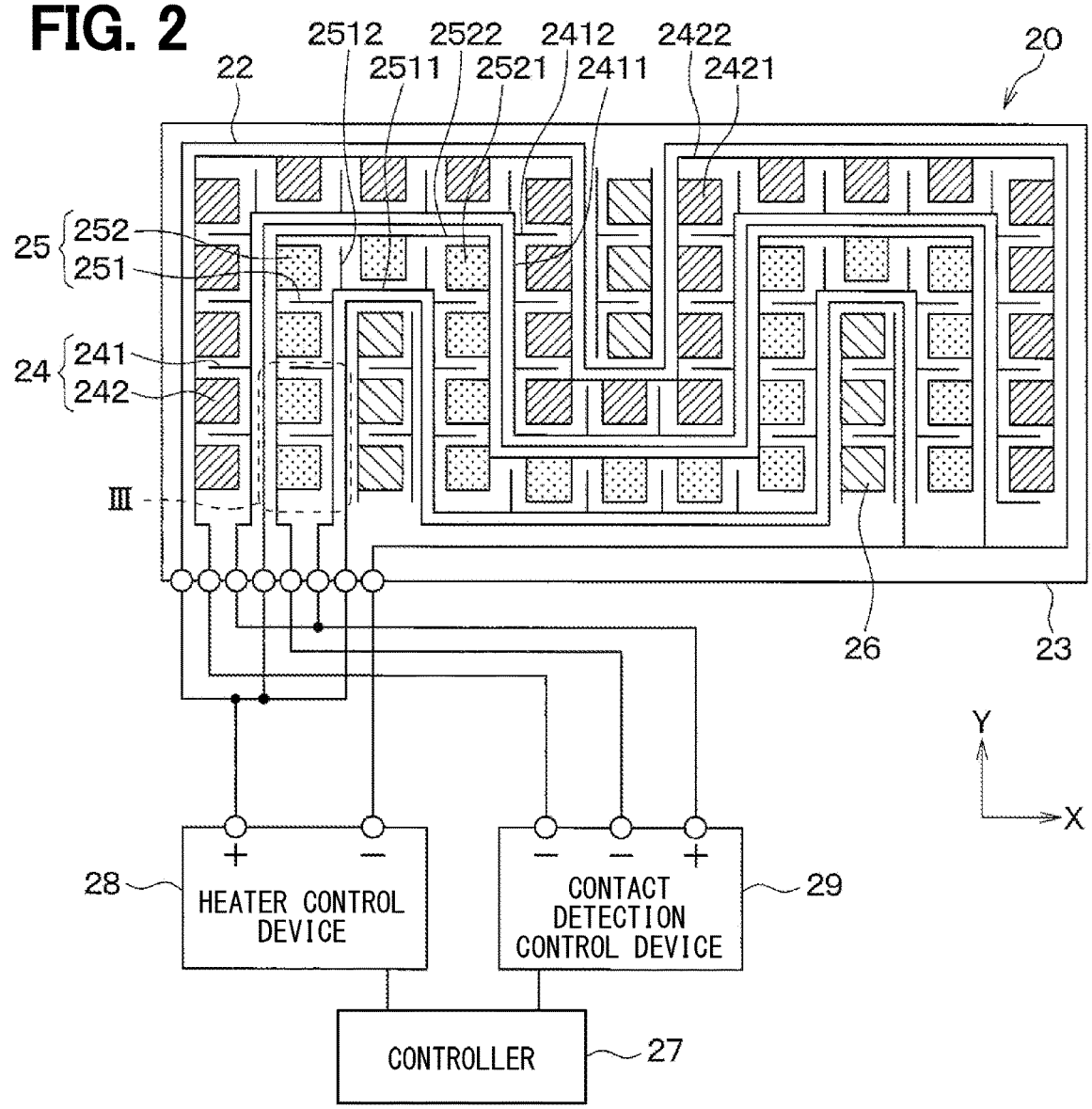
FIG. 2 is a diagram showing an overall configuration of the heater device according to the first embodiment.
Figure 3:
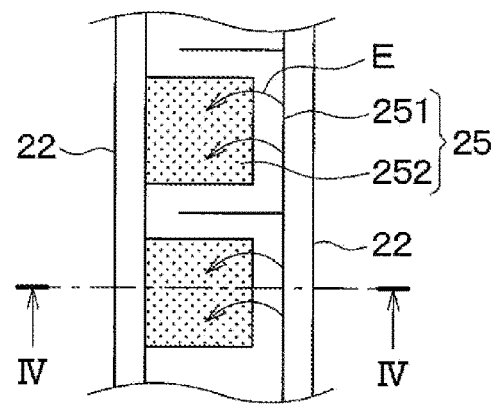
FIG. 3 is an enlarged view of portion III in FIG. 2.

The configurations of the heater device 20 will be described with reference to FIGS. 2 to 5. As shown in FIGS. 2 to 3, the heater device 20 has an insulating substrate 23 extending along a XY plane defined by an axis X and an axis Y. The insulating substrate 23 has a thickness in a direction of an axis Z. The insulating substrate 23 is formed in a substantially quadrangular thin plate shape.

The heater device 20 includes a heat generating portion 22, the insulating substrate 23, a first detection pattern 24, a second detection pattern 25, a dummy pattern 26, an insulating layer 230, a controller 27, a heater control device 28, and a contact detection control device 29. In addition, in FIGS. 2 to 3, the insulating layer 230 is omitted.

The heat generating portion 22, the first detection pattern 24, the second detection pattern 25, and the dummy pattern 26 are formed by pattern printing on the surface of the insulating substrate 23 on the occupant side. The heat generating portion 22, the first detection pattern 24, the second detection pattern 25, and the dummy pattern 26 of the present embodiment are arranged on one surface of the insulating substrate 23.

The heat generating portion 22 is arranged between a positive electrode terminal and a negative electrode terminal of the heater control device 28. The heat generation portion 22 can radiate the radiant heat H that causes the occupant 12 to feel warmth by being heated to a predetermined radiation temperature. The heat generation portion 22 is made of a material having a high thermal conductivity.

The heat generating portion 22 has a linear shape and generates heat when energized. The heat generation portion 22 can be made of a metallic material. The material of the heat generation portion 22 is selected from materials whose thermal conductivity is lower than copper. For example, the heat generation portion 22 may be made of copper, alloy of copper and tin (Cu—Sn), a metal such as silver, tin, stainless steel, nickel, and nichrome, or alloy including at least one of silver, tin, stainless steel, nickel or nichrome.

The first detection pattern 24 has a first transmitting electrode 241 and a first receiving electrode 242 arranged apart from each other, and detects a change in capacitance between the first transmitting electrode 241 and the first receiving electrode 242. The first transmitting electrode 241 has a main line portion 2411 and a plurality of branch portions 2412 branching from the middle of the main line portion 2411. The first receiving electrode 242 has a plurality of plate-shaped portions 2421 having a rectangular shape, and a linear connecting portion 2422 connecting each of the plate-shaped portions 2421.

The second detection pattern 25 has a second transmitting electrode 251 and a second receiving electrode 252 arranged apart from each other, and detects a change in capacitance between the second transmitting electrode 251 and the second receiving electrode 252. The second transmitting electrode 251 has a main line portion 2511 and a plurality of branch portions 2512 branching from the middle of the main line portion 2511. The second receiving electrode 252 has a plurality of plate-shaped portions 2521 having a rectangular shape, and a linear connecting portion 2522 connecting each of the plate-shaped portions 2521.

In FIG. 2, the plate-shaped portion 2421, the plate-shaped portion 2521, and the dummy pattern 26 are shown by hatching. The plate-shaped portion 2421 and the plate-shaped portion 2521 having the rectangular shapes are arranged so as to meander in the XY plane at predetermined intervals. Further, the plate-shaped portion 2421 and the plate-shaped portion 2521 are arranged so as to extend in parallel.

The first transmitting electrode 241 and the second transmitting electrode 251 are each connected to the positive electrode terminal of the contact detection control device 29. Further, the first receiving electrode 242 and the second receiving electrode 252 are each connected to the negative electrode terminal of the contact detection control device 29.

The branch portion 2412 extends from the main line portion 2411 toward between the plate-shaped portions 2421. Further, the branch portion 2512 also extends from the main line portion 2511 toward the plate-shaped portions 2521.

The insulating layer 230 has high insulating properties, and is made of, for example, a polyimide film or an insulating resin.

The controller 27 is configured as a computer equipped with a CPU, a memory, an I/O, and the like, and the CPU executes various processes according to a program stored in the memory. The controller 27 controls the heater control device 28 based on the signal output from the contact detection control device 29. The memory is a non-transitory tangible storage medium.

The heater control device 28 is configured to energize the heat generating portion 22. The positive electrode terminal of the heater control device 28 is connected to one end of the heat generating portion 22, and the negative electrode terminal of the heater control device 28 is connected to the other end of the heat generating portion 22.

The contact detection control device 29 forms an electric field between the first transmitting electrode 241 and the first receiving electrode 242, and also forms an electric field between the second transmitting electrode 251 and the second receiving electrode 252. Then, the proximity or contact of the object is determined based on the change in capacitance between the first transmitting electrode 241 and the first receiving electrode 242 and the change in capacitance between the second transmitting electrode 251 and the second receiving electrode 252.

Further, the contact detection control device 29 determines the disconnection of the first detection pattern 24 or the second detection pattern 25 based on the change in capacitance between the first transmitting electrode 241 and the first receiving electrode 242 and the change in capacitance between the second transmitting electrode 251 and the second receiving electrode 252.

Figure 4:
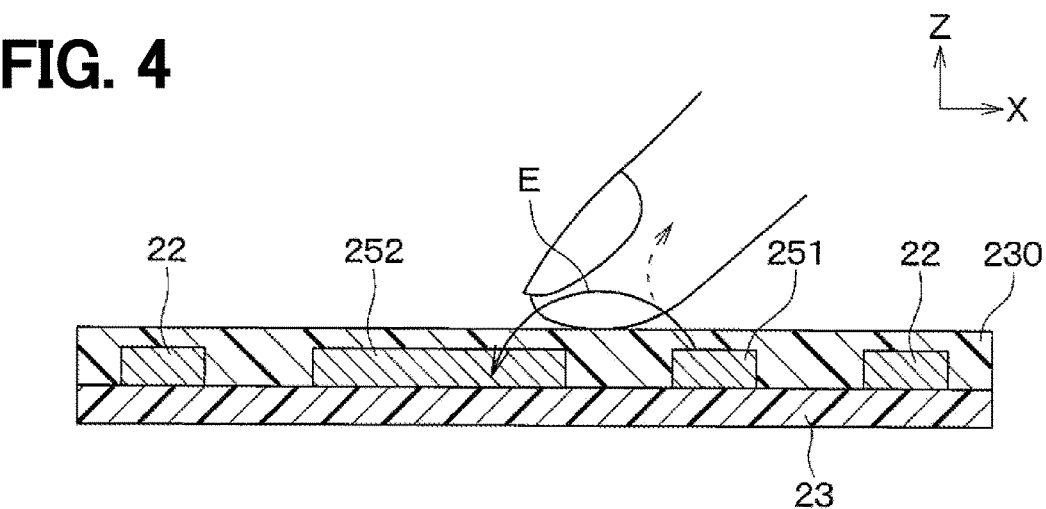
FIG. 4 is a cross-sectional view taken along line IV-IV in FIG. 3.

As shown in FIG. 4, when a fingertip of the occupant 12 comes into contact with the insulating layer 230, a part of the electric field E formed between the second transmitting electrode 251 and the second receiving electrode 252 moves to a fingertip side, and the electric field detected by the receiving electrode 252 is reduced. Then, the capacitance between the second transmitting electrode 251 and the second receiving electrode 252 changes. The contact detection control device 29 detects the object by determining whether or not the change in capacitance between the second transmitting electrode 251 and the second receiving electrode 252 is equal to or greater than a threshold value.

Figure 5:
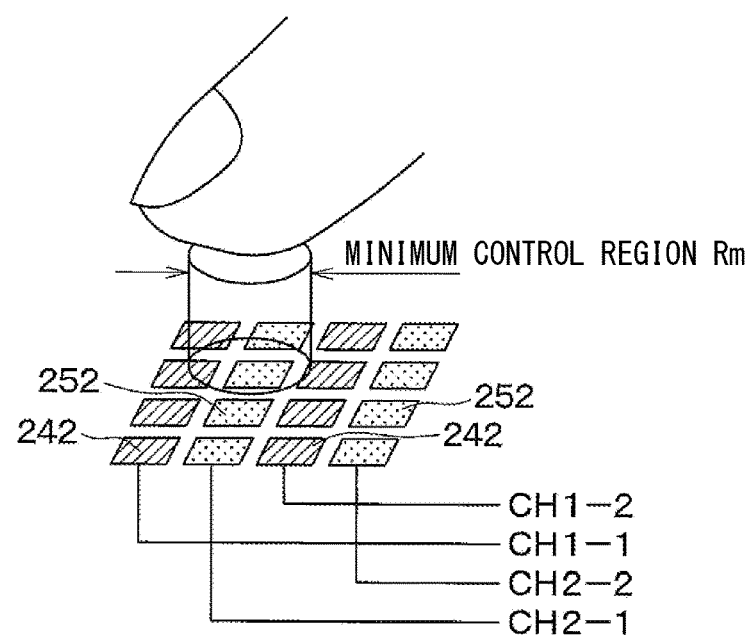
FIG. 5 is a diagram for explaining a minimum contact area.

In the heater device 20 of the present embodiment, the first transmitting electrode 241, the first receiving electrode 242, the second transmitting electrode 251 and the second receiving electrode 252 are densely arranged. Here, as shown in FIG. 5, a circle having a diameter of 5 mm projected onto the insulating substrate 23 from the normal direction of the insulating substrate 23 is defined as a minimum contact region Rm. According to the heater device 20 of the present embodiment, at least a part of the first transmitting electrode 241, at least a part of the first receiving electrode 242, at least a part of the second transmitting electrode 251, and at least a part of the second receiving electrode 252 overlap with the minimum contact region Rm.

The contact area when a child's fingertip comes into contact with the object is less than about 5 mm in diameter. The circle having a diameter of 5 mm, which is the minimum contact area Rm, has a size slightly larger than the contact area when the child's fingertip contacts the insulating layer 230. That is, when the fingertip of the child comes into contact with the insulating layer 230, the fingertip of the child contacts at least a part of the first transmitting electrode 241, at least a part of the first receiving electrode 242, at least a part of the second transmitting electrode 251, and at least a part of the second receiving electrode 252. The heater device is configured such that the contact of the fingertip of the child can be reliably detected by the first transmitting electrode 241, the first receiving electrode 242, the second transmitting electrode 251, and the second receiving electrode 252.

Figures 6, 7:
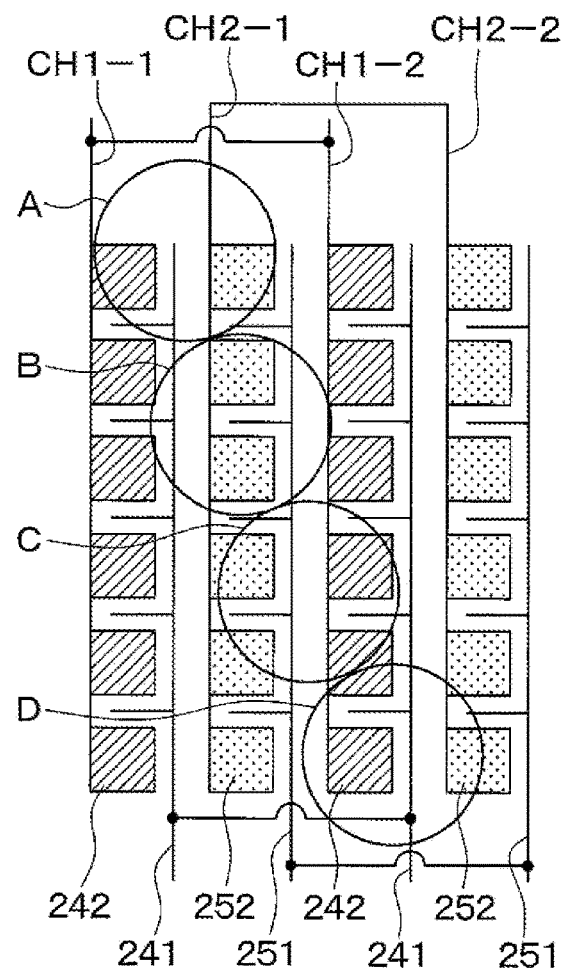
FIG. 6 is a diagram showing a state in which an object comes into contact with regions A to D.
FIG. 7 is a diagram showing channels in which a change in capacitance equal to or greater than a threshold value is detected when an object comes into contact with regions A to D in FIG. 6.

When an object comes into contact with the region A in FIG. 6, as shown in FIG. 7, the change in capacitance being equal to or higher than the threshold value is detected in channels 1-1 and 2-1. The change in capacitance being equal to or higher than the threshold is not detected in channels 1-2 and 2-2.

Next, when the object moves to the region B in FIG. 6 while touching, as shown in FIG. 7, the change in capacitance being equal to or higher than the threshold value is detected in channels 1-1, 1-2 and 2-1. The change in capacitance being equal to or higher than the threshold is not detected in channel 2-2.

Next, when the object moves to the region C in FIG. 6 while touching, as shown in FIG. 7, the change in capacitance being equal to or higher than the threshold value is detected in channels 1-2 and 2-1. The change in capacitance being equal to or higher than the threshold is not detected in channels 1-1 and 2-2.

Next, when the object moves to the region D in FIG. 6 while touching, as shown in FIG. 7, the change in capacitance being equal to or higher than the threshold value is detected in channels 1-2 and 2-2. The change in capacitance being equal to or higher than the threshold is not detected in channels 1-1 and 2-1.

As described above, when the contact area of the object in contact with the insulating layer 230 is equal to or larger than the minimum contact area Rm, the change in capacitance being equal to or higher than the threshold value is detected in both channels of the two channels which are composed of first channel consisting of channels 1-1 and 1-2 and second channel consisting of channels 2-1 and 2-2. Then, when an abnormality of the capacitance value being equal to or higher than the threshold value is detected in only one channel, namely in only first channel or only second channel, the controller 27 of the heater device 20 determines that at least one of the first detection pattern 24 and the second detection pattern 25 is disconnected.

Figure 8:
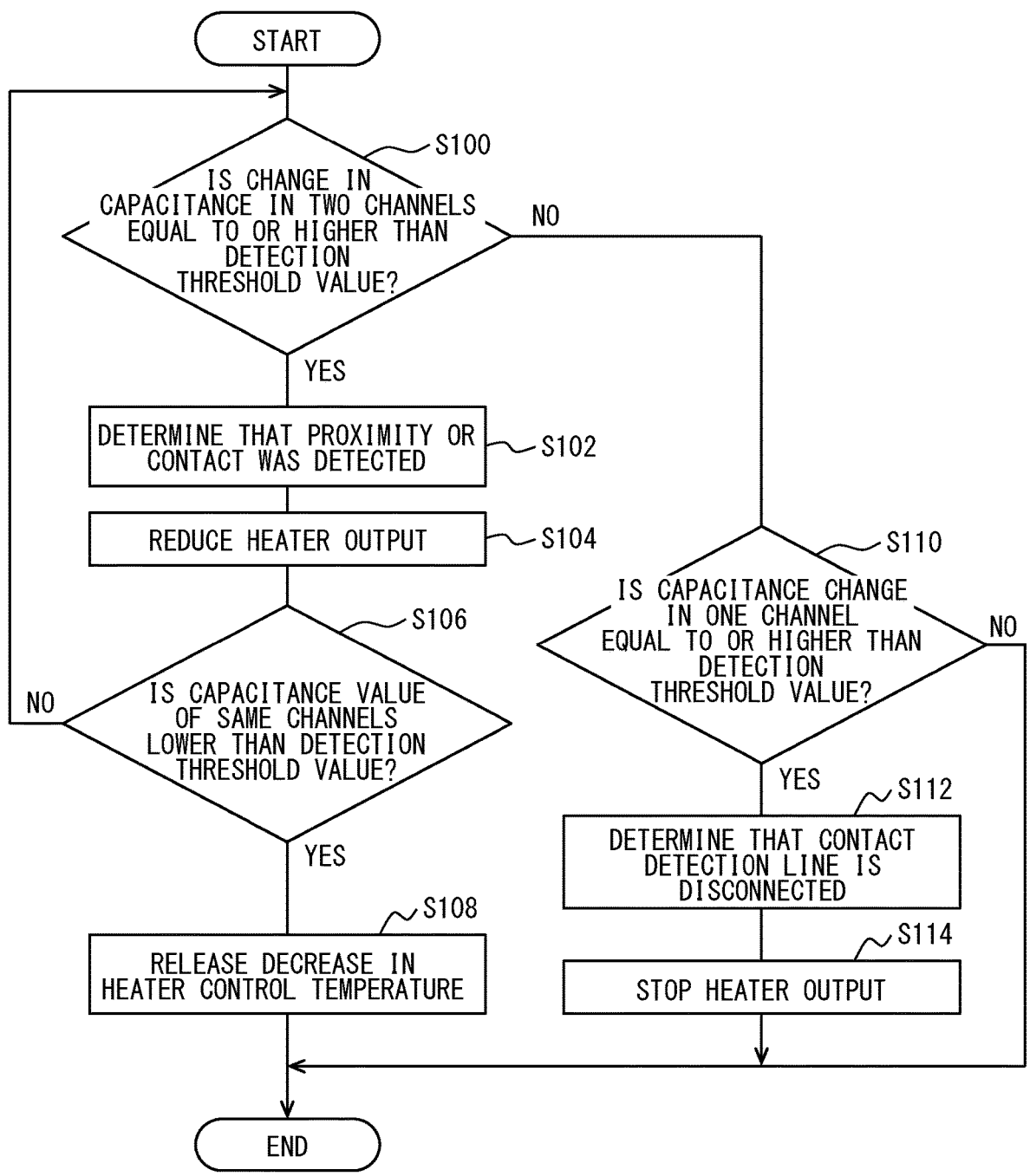
FIG. 8 is a flowchart of a controller of the heater device according to the first embodiment.

Next, the processing of the controller 27 will be described with reference to FIG. 8. The controller 27 periodically performs the processing shown in FIG. 8.

First, the controller 27 determines in S100 whether or not there is a capacitance change being equal to or higher than the detection threshold value in the two channels. Here, the first detection pattern 24 is defined as first channel, and the second detection pattern 25 is defined as second channel. That is, it is determined whether or not the change in capacitance between the first transmitting electrode 241 and the first receiving electrode 242 is equal to or higher than the first threshold value, and the change in capacitance between the second transmitting electrode 251 and the second receiving electrode 252 is equal to or higher than the second threshold value.

Here, when the change in capacitance between the first transmitting electrode 241 and the first receiving electrode 242 is equal to or higher than the first threshold value, and the change in capacitance between the second transmitting electrode 251 and the second receiving electrode 252 is equal to or higher than the second threshold value, the determination of S100 is YES. Next, the controller 27 determines in S102 that the proximity or contact of the object is detected.

Next, the controller 27 reduces the heater output in S104. Specifically, the amount of electricity supplied to the heat generating portion 22 is reduced. As a result, the amount of heat generated by the heater device 20 is reduced.

Next, in S106, the controller 27 determines whether or not the capacitance value in the same channels is lower than the detection threshold value. Here, if the proximity or contact of the object continues and the capacitance value of the same channels is not lower than the detection threshold value, the determination of S106 becomes NO and the process returns to S100.

Further, when the proximity or contact of the object disappears and the capacitance value of the same channels becomes lower than the detection threshold value, the determination in S106 becomes YES, and the controller 27 releases the decrease in the heater control temperature in S108. Specifically, the controller 27 returns to the heater control temperature before reducing the heater output in S104, and continues the heater output based on the heater control temperature.

If NO is determined in S100, the controller 27 determines in S110 whether or not there is the capacitance change equal to or higher than the detection threshold value in one channel. That is, it is determined whether or not the change in capacitance between the first transmitting electrode 241 and the first receiving electrode 242 is equal to or higher than the first threshold value, and the change in capacitance between the second transmitting electrode 251 and the second receiving electrode 252 is lower than the second threshold value.

Here, when the capacitance determination unit determines that the change in capacitance between the first transmitting electrode 241 and the first receiving electrode 242 is equal to or higher than the first threshold value, and that the change in capacitance between the second transmitting electrode 251 and the second receiving electrode 252 is lower than the second threshold value, the determination in S110 becomes YES. Then, the controller 27 determines in S112 that the first detection pattern 24 or the second detection pattern 25 is disconnected.

Next, the controller 27 stops the heater output in S114 and ends this process. Specifically, the energization of the heat generating portion 22 is cut off. As a result, the heat generation of the heater device 20 is stopped, and safety is ensured.

As described above, the heater device 20 includes the first detection pattern 24 arranged on the insulating substrate 23, having the first transmitting electrode 241 and the first receiving electrode 242 for detecting the object, and the first detection pattern 24 detects the change in capacitance between the first transmitting electrode 241 and the first receiving electrode 242.

Further, the heater device 20 includes the second detection pattern 25 arranged on the insulating substrate 23, having the second transmitting electrode 251 and the second receiving electrode 252 for detecting the object, and the second detection pattern 25 detects the change in capacitance between the second transmitting electrode 251 and the second receiving electrode 252.

The capacitance determination unit S110 in the heater device 20 determines whether or not the change in capacitance between the first transmitting electrode 241 and the first receiving electrode 242 is equal to or higher than the first threshold value, and the change in capacitance between the second transmitting electrode 251 and the second receiving electrode 252 is lower than the second threshold value.

When the capacitance determination unit determines that the change in capacitance between the first transmitting electrode 241 and the first receiving electrode 242 is equal to or higher than the first threshold value, and that the change in capacitance between the second transmitting electrode 251 and the second receiving electrode 252 is lower than the second threshold value, the disconnection determination unit S112 determines that the disconnection occurs. The disconnection determination unit S112 determines that the first detection pattern 24 or the second detection pattern 25 is disconnected.

According to such a configuration, it is determined that the first detection pattern 24 or the second detection pattern 25 is disconnected. That is, it is possible to detect and determine the disconnection of the detection patterns 24 and 25.

In the heater device 20, the second capacitance determination unit (S100) determines whether or not the change in capacitance between the first transmitting electrode 241 and the first receiving electrode 242 is equal to or higher than the first threshold value, and the change in capacitance between the second transmitting electrode 251 and the second receiving electrode 252 is lower than the second threshold value.

When the capacitance determination unit determines that the change in capacitance between the first transmitting electrode 241 and the first receiving electrode 242 is equal to or higher than the first threshold value, and that the change in capacitance between the second transmitting electrode 251 and the second receiving electrode 252 is equal to or higher than the second threshold value, the object determination unit (S102) determines that the object is detected.

According to such a configuration, when the change in capacitance between the first transmitting electrode 241 and the first receiving electrode 242 is equal to or higher than the first threshold value, and the change in capacitance between the second transmitting electrode 251 and the second receiving electrode 252 is equal to or higher than the second threshold value, it is determined that the object has been detected. That is, the object can be detected.

A circular region having a diameter of 10 mm projected onto the insulating substrate from the normal direction of the insulating substrate 23 is virtualized. At least a part of the first transmitting electrode 241, at least a part of the first receiving electrode 242, at least a part of the second transmitting electrode 251, and at least a part of the second receiving electrode 252 overlap with the above circular region. Therefore, for example, it is possible to accurately detect the contact of an adult's fingertip.

Further, the heat generating portion 22 is arranged on one surface of the insulating substrate 23, and the first transmitting electrode 241, the first receiving electrode 242, the second transmitting electrode 251 and the second receiving electrode 252 are located between the heat generating portions 22. Therefore, it is possible to accurately detect an object that is about to come into contact with the heat generating portion 22. In addition, the configuration can be simplified. Further, the heat of the heat generating portion 22 can be dissipated by the first and second detection patterns 24 and 25, and when the human body comes into contact with the heat generating portion 22, the temperature of the contact portion can be rapidly lowered.

Second Embodiment

Figure 9:
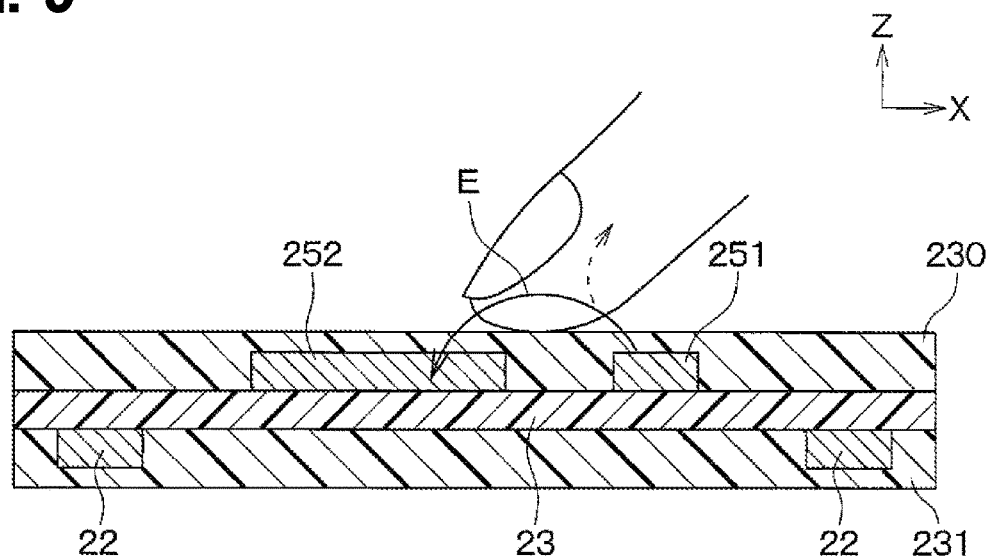
FIG. 9 is a schematic cross-sectional view of the heater device according to a second embodiment, which corresponds to FIG. 4.

A heater device of a second embodiment will be described with reference to FIGS. 9 and 10. As shown in FIG. 9, in the heater device of the first embodiment, the first transmitting electrode 241, the first receiving electrode 242, the second transmitting electrode 251 and the second receiving electrode 252 are arranged on one surface of the insulating substrate 23, and the heat generating portion 22 is arranged on the other surface of the insulating substrate 23.

Figure 10:
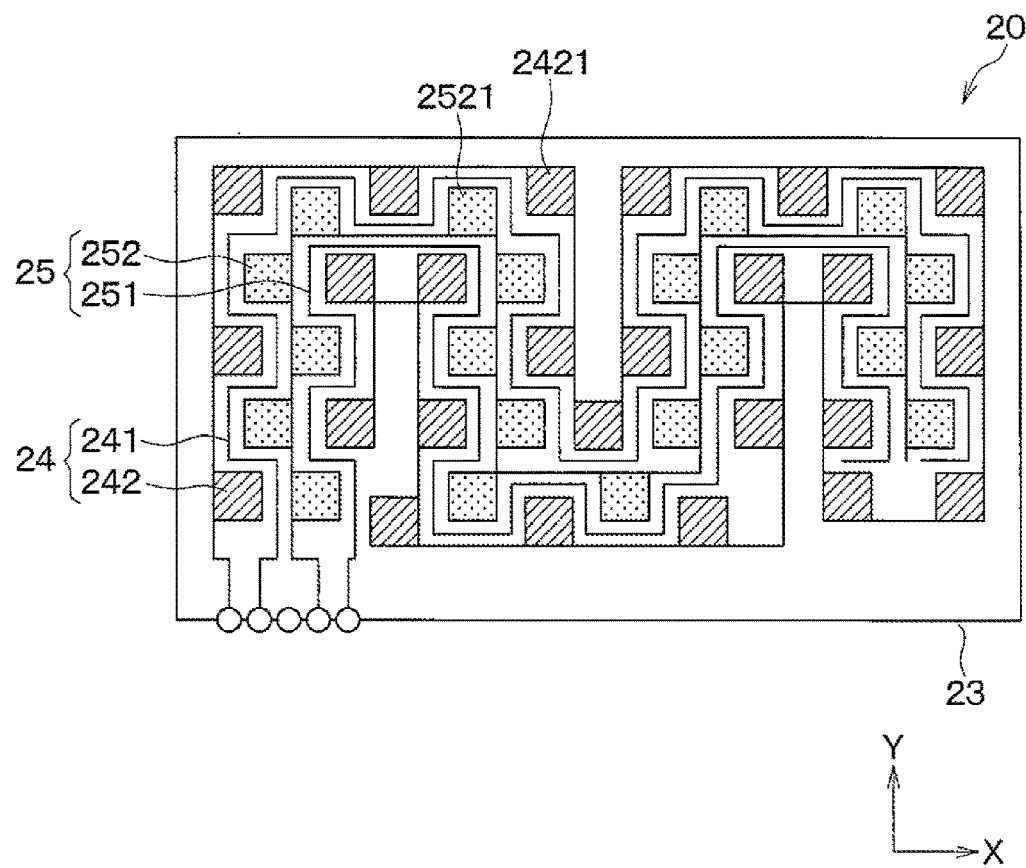
FIG. 10 is a diagram showing a configuration of the heater device according to the second embodiment.

Further, as shown in FIG. 10, the plate-shaped portion 2421 of the first receiving electrode 242 and the plate-shaped portion 2521 of the second receiving electrode 252 are arranged alternately in the XY plane. In this way, since the plate-shaped portion 2421 of the first receiving electrode 242 and the plate-shaped portion 2521 of the second receiving electrode 252 are alternately arranged, it is possible to arrange the detection patterns corresponding to two channels in a small area.

As described above, the first transmitting electrode 241, the first receiving electrode 242, the second transmitting electrode 251 and the second receiving electrode 252 are arranged on one surface of the insulating substrate 23, and the heat generating portion 22 is arranged on the other surface of the insulating substrate 23.

In this way, the first transmitting electrode 241, the first receiving electrode 242, the second transmitting electrode 251 and the second receiving electrode 252 are arranged on one surface of the insulating substrate 23, and the heat generating portion 22 can be arranged on the other surface of the insulating substrate 23.

In the present embodiment, the same advantages as those obtained from the configuration common to the first embodiment can be obtained in the same manner as in the first embodiment.

Other Embodiments (1) In the above embodiment, based on the contact area when the child's fingertip comes into contact with the object, the minimum contact area Rm is a circle having a diameter of 5 mm projected onto the insulating substrate 23 from the normal direction of the insulating substrate 23. On the other hand, for example, in consideration of the contact area when an adult's fingertip comes into contact with the object, the minimum contact area may be a circle having a diameter of 10 mm projected onto the insulating substrate 23 from the normal direction of the insulating substrate 23 can be formed.

(2) In each of the above embodiments, an example including the first detection pattern 24 and the second detection pattern 25 is shown, but the configuration may further include a third detection pattern, a fourth detection pattern, and the like.

The present disclosure is not limited to the above-described embodiments, and can be appropriately modified. The embodiments described above are not independent of each other, and can be appropriately combined except when the combination is obviously impossible. The constituent element(s) of each of the above embodiments is/are not necessarily essential unless it is specifically stated that the constituent element(s) is/are essential in the above embodiment, or unless the constituent element(s) is/are obviously essential in principle. Furthermore, in each of the above embodiments, in the case where the number of the constituent element(s), the value, the amount, the range, and/or the like is specified, the present disclosure is not necessarily limited to the number of the constituent element(s), the value, the amount, and/or the like specified in the embodiment unless the number of the constituent element(s), the value, the amount, and/or the like is indicated as indispensable or is obviously indispensable in view of the principle of the present disclosure. Furthermore, a material, a shape, a positional relationship, or the like, if specified in the above-described example embodiments, is not necessarily limited to the specific material, shape, positional relationship, or the like unless it is specifically stated that the material, shape, positional relationship, or the like is necessarily the specific material, shape, positional relationship, or the like, or unless the material, shape, positional relationship, or the like is obviously necessary to be the specific material, shape, positional relationship, or the like in principle.

(Overview)

According to the first aspect shown in part or all of the above embodiments, the heater device includes the first detection pattern arranged on the insulating substrate, having the first transmitting electrode and the first receiving electrode for detecting the object, and the first detection pattern detects the change in capacitance between the first transmitting electrode and the first receiving electrode. Further, the heater device includes the second detection pattern arranged on the insulating substrate, having the second transmitting electrode and the second receiving electrode for detecting the object, and the second detection pattern detects the change in capacitance between the second transmitting electrode and the second receiving electrode. In the heater device, the capacitance determination unit determines whether or not one of the change in capacitance between the first transmitting electrode and the first receiving electrode and the change in capacitance between the second transmitting electrode and the second receiving electrode is equal to or higher than the first threshold value, whether or not the other of the change in capacitance between the first transmitting electrode and the first receiving electrode and the change in capacitance between the second transmitting electrode and the second receiving electrode is lower than the second threshold value. Further, when the capacitance determination unit determines that one of the change in capacitance between the first transmitting electrode and the first receiving electrode and the change in capacitance between the second transmitting electrode and the second receiving electrode is equal to or higher than the first threshold value, and the other of the change in capacitance between the first transmitting electrode and the first receiving electrode and the change in capacitance between the second transmitting electrode and the second receiving electrode is lower than the second threshold value, the disconnection determination unit determines that the disconnection of the first detection pattern or the second detection pattern occurs.

Further, according to the second aspect, the capacitance determination unit is the first capacitance determination unit. The second capacitance determination unit in the heater device determines whether or not the change in capacitance between the first transmitting electrode and the first receiving electrode is equal to or higher than the first threshold value, and the change in capacitance between the second transmitting electrode and the second receiving electrode is equal to or higher than the second threshold value. When the capacitance determination unit determines that the change in capacitance between the first transmitting electrode and the first receiving electrode is equal to or higher than the first threshold value, and that the change in capacitance between the second transmitting electrode and the second receiving electrode is equal to or higher than the second threshold value, the object determination unit determines that the object is detected.

According to such a configuration, when the change in capacitance between the first transmitting electrode and the first receiving electrode is equal to or higher than the first threshold value, and the change in capacitance between the second transmitting electrode and the second receiving electrode is equal to or higher than the second threshold value, it is determined that the object has been detected. That is, the object can be detected.

Further, according to the third aspect, at least a part of the first transmitting electrode and at least a part of the first receiving electrode are arranged to overlap with the circular region having a diameter of 10 mm projected on the insulating substrate from the normal direction of the insulating substrate. Further, at least a part of the second transmitting electrode and at least a part of the second receiving electrode are also arranged so as to overlap with the circular region having a diameter of 10 mm. Therefore, for example, it is possible to accurately detect the contact of an adult's fingertip. The circular region with a diameter of 10 mm is set, but the diameter of the circular region can be changed depending on the object. The circular region may include a polygonal region similar to the circular region.

Further, according to the fourth aspect, the heat generating portion is arranged on one surface of the insulating substrate, and the first transmitting electrode, the first receiving electrode, the second transmitting electrode and the second receiving electrode are located between the heat generating portions. Therefore, it is possible to accurately detect an object that is about to come into contact with the heat generating portion. In addition, the configuration can be simplified. Further, the heat of the heat generating portion can be dissipated by the first and second detection patterns, and when the human body comes into contact with the heat generating portion, the temperature of the contact portion can be rapidly lowered.

According to the fifth aspect, the first transmitting electrode, the first receiving electrode, the second transmitting electrode and the second receiving electrode are arranged on one surface of the insulating substrate, and the heat generating portion is arranged on the other surface of the insulating substrate.

In this way, the first transmitting electrode, the first receiving electrode, the second transmitting electrode and the second receiving electrode are arranged on one surface of the insulating substrate, and the heat generating portion can be arranged on the other surface of the insulating substrate.

The process of S110 corresponds to the first capacitance determination unit, and the process of S112 corresponds to the disconnection determination unit. Further, the process of S100 corresponds to the second capacitance determination unit, and the process of S102 corresponds to the object determination unit.

What is claimed is:

1. A heater device having a heat generating portion configured to generate a heat output arranged on an insulating substrate, comprising:

a first detection pattern arranged on the insulating substrate, having a first transmitting electrode and a first receiving electrode for detecting an object, the first detection pattern being configured to detect a change in capacitance between the first transmitting electrode and the first receiving electrode;

a second detection pattern arranged on the insulating substrate, having a second transmitting electrode and a second receiving electrode for detecting the object, the second detection pattern being configured to detect a change in capacitance between the second transmitting electrode and the second receiving electrode;

a capacitance determination unit configured to determine whether or not one of the change in capacitance between the first transmitting electrode and the first receiving electrode and the change in capacitance between the second transmitting electrode and the second receiving electrode is equal to or higher than a first threshold value, whether or not the other of the change in capacitance between the first transmitting electrode and the first receiving electrode and the change in capacitance between the second transmitting electrode and the second receiving electrode is lower than a second threshold value; and a disconnection determination unit configured to determine that a disconnection of the first detection pattern or the second detection pattern occurs, when the capacitance determination unit determines that one of the change in capacitance between the first transmitting electrode and the first receiving electrode and the change in capacitance between the second transmitting electrode and the second receiving electrode is equal to or higher than the first threshold value, and the other of the change in capacitance between the first transmitting electrode and the first receiving electrode and the change in capacitance between the second transmitting electrode and the second receiving electrode is lower than the second threshold value, wherein the heat output stops based on the determination of the disconnection determination unit that the disconnection of the first detection pattern or the second detection pattern occurs.

2. The heater device according to claim 1, wherein the capacitance determination unit is a first capacitance determination unit, and further comprising, a second capacitance determination unit configured to determine whether or not the change in capacitance between the first transmitting electrode and the first receiving electrode is equal to or higher than the first threshold value, and the change in capacitance between the second transmitting electrode and the second receiving electrode is equal to or higher than the second threshold value, and an object determination unit configured to determine that the object is detected, when the capacitance determination unit determines that the change in capacitance between the first transmitting electrode and the first receiving electrode is equal to or higher than the first threshold value, and that the change in capacitance between the second transmitting electrode and the second receiving electrode is equal to or higher than the second threshold value.

3. The heater device according to claim 1, wherein at least a part of the first transmitting electrode, at least a part of the first receiving electrode, at least a part of the second transmitting electrode, and at least a part of the second receiving electrode overlap with a circular region having a diameter of 10 mm projected on the insulating substrate from a normal direction of the insulating substrate.

4. The heater device according to claim 1, wherein
the heat generating portion is arranged on one surface of the insulating substrate, and
the first transmitting electrode, the first receiving electrode, the second transmitting electrode, and the second receiving electrode are arranged between the heat generating portions.

5. The heater device according to claim 1, wherein
the first transmitting electrode, the first receiving electrode, the second transmitting electrode, and the second receiving electrode are arranged on one surface of the insulating substrate, and
the heat generating portion is arranged on the other surface of the insulating substrate.

6. A heater device having a heat generating portion configured to generate a heating output arranged on an insulating substrate, comprising:
a processor; and
a memory configured to store computer readable instructions that, when executed by the processor, cause the heater device to:
detect a change in capacitance between a first transmitting electrode and a first receiving electrode as a first detection pattern having the first transmitting electrode and the first receiving electrode arranged on the insulating substrate for detecting an object;
detect a change in capacitance between a second transmitting electrode and a second receiving electrode as a second detection pattern having the second transmitting electrode and the second receiving electrode arranged on the insulating substrate for detecting the object;
determine whether or not one of the change in capacitance between the first transmitting electrode and the first receiving electrode and the change in capacitance between the second transmitting electrode and the second receiving electrode is equal to or higher than a first threshold value, whether or not the other of the change in capacitance between the first transmitting electrode and the first receiving electrode and the change in capacitance between the second transmitting electrode and the second receiving electrode is lower than a second threshold value; and
determine that a disconnection of the first detection pattern or the second detection pattern occurs, when the capacitance determination unit determines that one of the change in capacitance between the first transmitting electrode and the first receiving electrode and the change in capacitance between the second transmitting electrode and the second receiving electrode is equal to or higher than the first threshold value, and the other of the change in capacitance between the first transmitting electrode and the first receiving electrode and the change in capacitance between the second transmitting electrode and the second receiving electrode is lower than the second threshold value,
wherein the processor stops the heating output based on the determination that the disconnection of the first detection pattern or the second detection pattern occurs.

7. The heater device according to claim 6, wherein
the heater device is further caused to
determine whether or not the change in capacitance between the first transmitting electrode and the first receiving electrode is equal to or higher than the first threshold value, and the change in capacitance between the second transmitting electrode and the second receiving electrode is equal to or higher than the second threshold value, and
determine that the object is detected, when the capacitance determination unit determines that the change in capacitance between the first transmitting electrode and the first receiving electrode is equal to or higher than the first threshold value, and that the change in capacitance between the second transmitting electrode and the second receiving electrode is equal to or higher than the second threshold value.

* * * * *